United States Patent [19]

McSherry

[11] 4,181,061

[45] Jan. 1, 1980

[54] FASTENING ELEMENT

[75] Inventor: Thomas W. McSherry, North Babylon, N.Y.

[73] Assignee: Mechanical Plastics Corporation, Pleasantville, N.Y.

[21] Appl. No.: 826,865

[22] Filed: Aug. 22, 1977

Related U.S. Application Data

[63] Continuation-in-part of Ser. No. 721,909, Sep. 15, 1976, abandoned.

[51] Int. Cl.² ............................................ F16B 13/04
[52] U.S. Cl. ............................................ 85/80; 85/83
[58] Field of Search ............... 85/3 K, 3 R, 3 S, 5 R, 85/37, 80–84; 151/41–75

[56] References Cited

U.S. PATENT DOCUMENTS

| | | | |
|---|---|---|---|
| 3,213,746 | 10/1965 | Dwyer | 85/80 |
| 3,342,098 | 9/1967 | Schuplin | 85/83 |
| 3,350,976 | 11/1967 | Topf | 85/83 X |
| 3,651,734 | 3/1972 | McSherry | 85/80 |
| 4,022,100 | 5/1977 | Johnson | 85/83 |

Primary Examiner—James C. Mitchell
Attorney, Agent, or Firm—Mechanical Plastics Corporation

[57] ABSTRACT

An integrally molded plastic fastening element comprises a head portion, a longitudinally extending body portion having a pair of longitudinally extending pillar-like parts, and a pair of substantially rigid locking arms pivotally connected to each other at their adjacent ends. The rigid arms are pivotally connected to the body portion at the ends of respective pillar-like parts at positions radially adjacent the cross section of the body so that the rigid arms bear the bulk of the load applied to the fastener. The advantages of this structure include enhanced load bearing capability and ease in fabrication. In a preferred embodiment, the body is provided with a central passageway, and the pillar-like parts are curved radially inwardly in order to spring bias the walls of the passageway against an elongated retaining member inserted therein and to spring bias the arms in an over-center locking position.

19 Claims, 23 Drawing Figures

FASTENING ELEMENT

CROSS-REFERENCE TO RELATED APPLICATIONS

This application is a continuation-in-part of application Ser. No. 721,909 filed Sept. 15, 1976, now abandoned.

BACKGROUND OF THE INVENTION

This invention relates to fastening elements and, more particularly, to an integrally molded plastic fastening element of enhanced load bearing capability and ease of fabrication.

Integrally molded plastic fastening elements of the type disclosed in U.S. Pat. No. 3,651,734, issued to the present inventor on Mar. 28, 1972, are rapidly gaining commercial acceptance, both here and abroad. These fastening elements comprise, in substance, a head for disposition at one end of an opening, expansible locking means for location at the other end of the opening, and flexible, spaced apart connectors extending therebetween.

These fastening elements typically utilize relatively long connectors which are expanded radially outward far beyond the edges of the opening when the fastening element is in its expanded, locking position. Specifically, the locking means typically comprises a pair of toggle members pivotally connected together at their adjacent ends so that they are movable between a collapsed position in which they can be inserted through an opening and an expanded position in which they secure the fastener within the opening. The connector elements are joined to the toggle members at such locations on the toggle members that when the toggle members are moved into the expanded position, the connectors are forced relatively far radially outward from their radial location in the collapsed condition so that they extend radially outward far beyond the edges of the opening. In this structure, much of the load borne by the fastening element is borne by the relatively long, relatively flexible connector elements.

While the fastening elements of U.S. Pat. No. 3,651,734 have proved highly satisfactory in a great variety of applications, the present invention is directed to a device having features particularly useful in applications requiring high load-bearing capability.

SUMMARY OF THE INVENTION

In accordance with the present invention, an integrally molded plastic fastening element comprises a head portion, a longitudinally extending body portion having a pair of longitudinally extending pillar-like parts, and a pair of substantially rigid locking arms pivotally connected to each other at their adjacent ends. The rigid arms are pivotally connected to the body portion at the ends of respective pillar-like parts at positions radially adjacent the cross section of the body so that the rigid arms bear the bulk of the load applied to the fastener. The advantages of this structure include enhanced load bearing capability and ease in fabrication. In a preferred embodiment, the body is provided with a central passageway and the pillar-like parts are curved radially inwardly in order to spring bias the walls of the passageway against an elongated retaining member inserted therein and to spring bias the arms in an over-center locking position.

BRIEF DESCRIPTION OF THE DRAWINGS

The nature, advantages, and various additional features of the invention will appear more fully upon consideration of the illustrative embodiments now to be described in detail in connection with the accompanying drawings.

In the drawings.

For convenience of reference, the same structural elements are designated by the same reference numerals throughout the drawing.

DETAILED DESCRIPTION OF THE DRAWINGS

A. Prior Art (FIG. 1)

Figure 1:
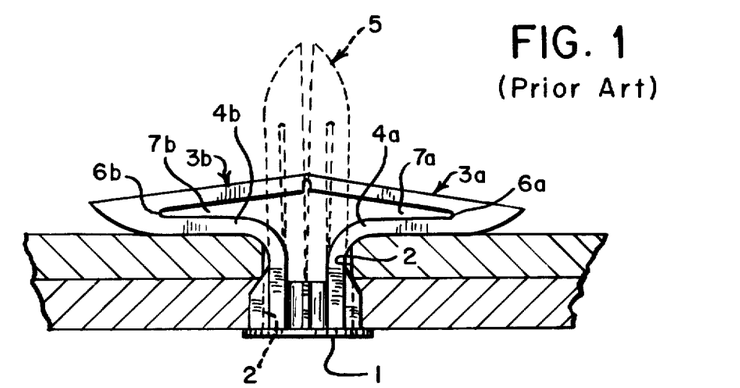
FIG. 1 is a schematic cross section of a typical prior art molded plastic fastening element.

Referring to the drawings, FIG. 1 is a schematic cross section of a typical prior art molded plastic fastening element showing the element in its molded configuration. This fastener comprises, in substance, a head 1 for disposition at one end of an opening 2, an expansible locking means in the form of toggle arms 3a and 3b for location at the other end of the opening and flexible, spaced apart connectors 4a and 4b extending therebetween.

Toggle arms 3a and 3b are pivotally connected together at their adjacent ends so that they are movable between a collapsed position 5 in which they can be inserted through opening 2 and their expanded position in which they secure the fastener within the opening.

The connector elements 4a and 4b are typically joined to the toggle arms 3a and 3b at such locations 6a and 6b that when the toggle members move into expanded position, the connectors are forced relatively far radially outward from their radial locations in the collapsed condition so that they extend far beyond the edges of the opening.

While fastening elements of this type have proved highly satisfactory in a great variety of applications, the present invention seeks to provide improvements in load bearing capability and ease of fabrication. With respect to load bearing capability, it can be seen by reference to FIG. 1 that the major portion of the load borne by the fastening element is borne by the long, flexible connector elements 4a and 4b. Moreover, the toggle arms 3a and 3b are relatively thin throughout the major portion of their length because they, in the collapsed state, must share the limited available space in the opening with the long connectors. These features necessarily limit the load bearing capability of a fastening element made of resilient plastic material.

With respect to ease of fabrication, it can be readily appreciated that remote joining locations 6a and 6b require thin knife edge components in the mold to define spaces 7a and 7b. Molding around these thin, knife edge components presents one of the more difficult aspects of fabricating these devices; and, because heat concentrating at the points of the knife edges weakens the plastic, the molding introduces points of weakness in the device.

B. First Embodiment (FIGS. 2–5)

In accordance with the invention, a molded plastic fastening element is provided with enhanced load bearing capability and improved ease of fabrication by connecting the toggle arms to the body at the ends of pillar-like parts in the region radially adjacent to or within the body cross section. This structure eliminates the necessity of thin knife edge molding and permits the use of substantially rigid toggle arms to bear the major portion of the load. FIGS. 2–5 illustrate a first embodiment of such a fastening element.

The fastener of FIGS. 2 through 5 comprises a head 10 of generally disc-like form and a body 12 disposed centrally upon and upstanding from the head 10 and locking means described herein.

Figure 2:
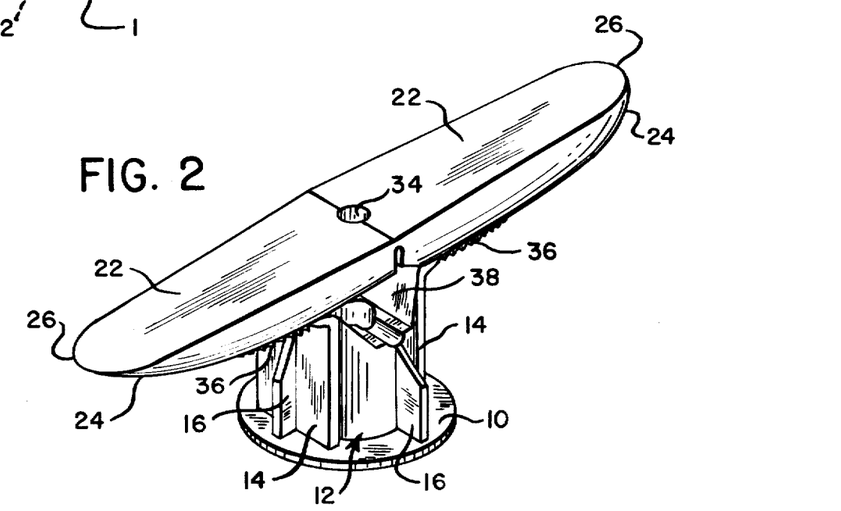
FIG. 2 is a perspective view of a first embodiment of a fastener element in accordance with the invention showing that element in the attitude in which it is molded.
Figures 3, 4, 5:
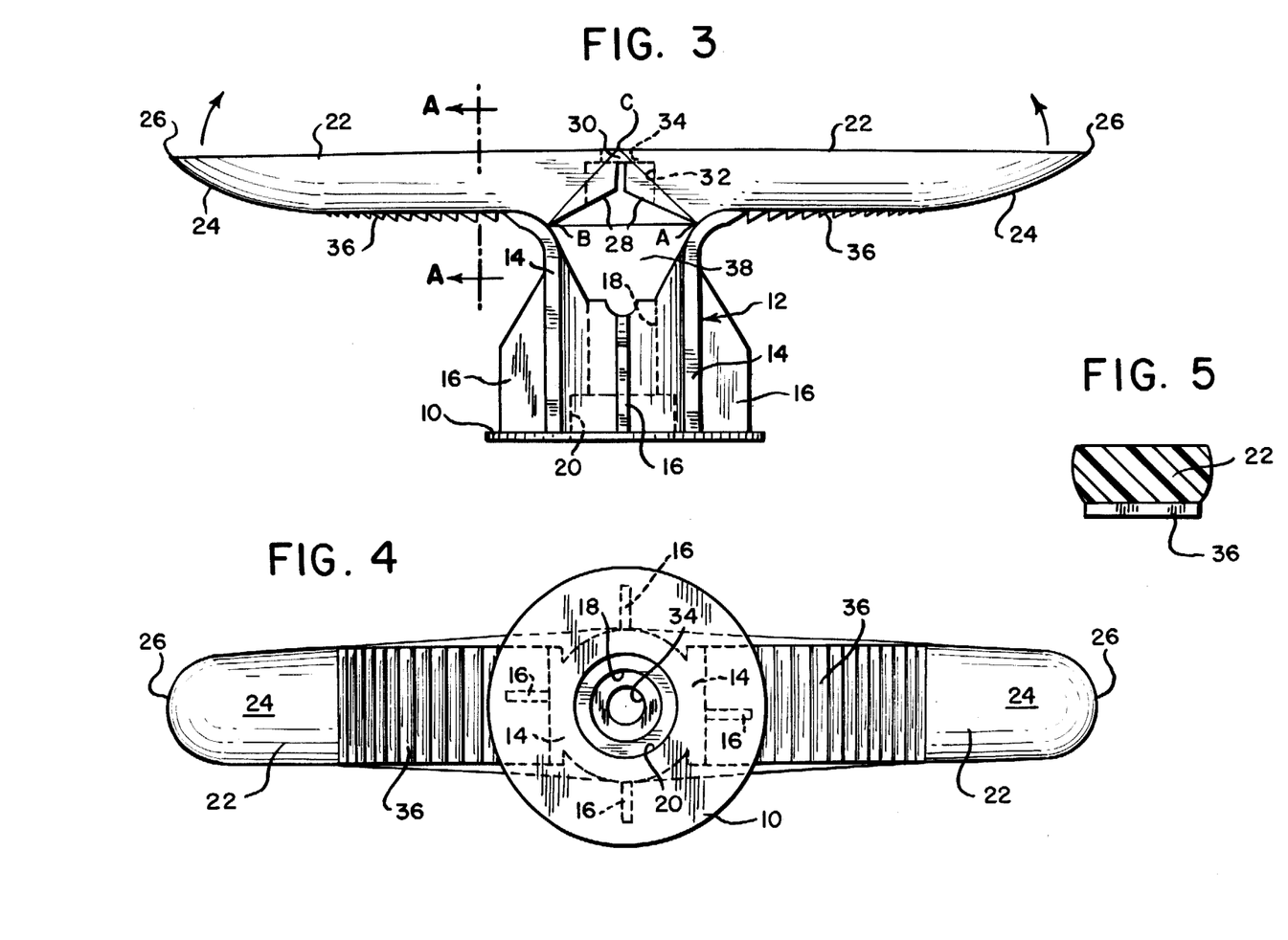
FIG. 3 is a side elevation of the fastener in FIG. 2.
FIG. 4 is a bottom plan view of the fastener in FIGS. 2 and 3.
FIG. 5 is a section on the line A—A of FIG. 3.

The body, as can be seen particularly in FIGS. 2 and 4, is of generally circular section, having a pair of diametrically opposed upstanding pillar-like portions 14 described more fully hereinafter. Spaced about the body 12 are fins, 16 in this particular embodiment there being four such fins. Extending through the head and through the body is a central passage 18 which has a larger diameter portion 20 at the head end which serves as a counterbore.

The locking means comprises a pair of generally similar arms 22 each substantially greater in length than the diameter of body 12. Each arm has, at its distal end, a smoothly curved surface 24 and tapers to extremity 26. At the inner ends the arms are relieved as at 28 and the arms are pivotally interconnected by means of a relatively thin, integral strap 30 to be movable towards and away from each other in a vertical plane including the longitudinal axis of the body. The central passage 18 is continued as at 32 in the adjacent regions of the arms 22 and a through opening 34 is formed in strap 30, that opening being coaxial with passage 18.

On the underside of the arms i.e., on that surface of the arms closest to the head, there are formed tooth-like configurations 36, the function of which is described more fully hereinafter.

The arms 22 are pivoted to the pillar-like portions 14 of the body at points A and B, the upper regions of those pillar-like portions being slightly flexible to accommodate the pivoting movement of the arms 22 about pivot C at strap 30 and about pivots A and B.

The upper end of the body, i.e., that end of the body most adjacent to the arms, is recessed as at 38 to accommodate the adjacent or proximal ends of the arms 22.

It can be seen from the drawings that the pivots A, B, and C are disposed at the apices of an isosceles triangle when the locking means are in their expanded position, i.e., in that position illustrated in the drawings, the line connecting pivots A and B constituting the base of that triangle and lines AC and BC constituting sides of that triangle. It is to be noted that sides AC and BC of the triangle are of greater length that one-half the base AB.

In operation, a hole is formed in a surface within which the fastener is to be secured. The particular embodiment of the invention here illustrated is one for use in providing an anchor into which a screw may be secured within a panel structure which would not ordinarily carry the load applied to a screw inserted directly into it, as for example, into a gypsum board panel. The hole formed in such a panel is of slightly larger cross section than the cross section of the body of the fastener and to insert the fastener, arms 22 are folded about pivots A, B, and C so that the upper surfaces thereof, i.e., those surfaces most remote from the head 10, are brought into face to face relationship and the arms are disposed generally parallel to the axis of the body portion of the fastener. The fastener is then inserted through the opening with the fins 16 cutting into the marginal edges defining the opening of the panel to prevent rotation of the fastener upon the application of torque thereto.

It will be appreciated that, as indicated in the drawings, the body length from the head to the topmost portions of the pillar-like sections is approximately similar to the thickness of the panel to which the fastener is to be secured.

When the arms are folded to the collapsed position in which they are generally parallel to the axis of the body portion, the pivot C will move across the base line AB of triangle ABC, and as the arms clear that end of the opening of the panel opposite to the end from which the fastener is inserted, the arms will tend to move to their expanded position. A screw inserted into the fastener will with its leading end abutting the strap 30 cause the pivot C to be shifted to the position shown in FIG. 3 and the shank of the screw will fill the greater part of the recess at the upper end of the body and between the pillar portions. During this movement of the arms to the expanded position, the upper portions of the pillar 14 will flex slightly to allow pivot C to move across center, those pivots shifting slightly apart and, as the pivot C moves across center, returning to the position shown in FIG. 3. It is to be appreciated that the passage 18 is of lesser diameter than the screw for which the fastener is designed so that the screw will cut into the side walls of that passage as it is driven into the fastener.

The tooth-like configurations 36 on the undersurfaces of the arms 24 will tend to resist any movement of the arms to a collapsed position and, of course, the major resistance to such movement will be the fact that the arms are, by virtue of the position of the pivot C, in an overcenter or toggled condition.

C. Second Embodiment (FIGS. 6, 7 and 8)

Figure 6:
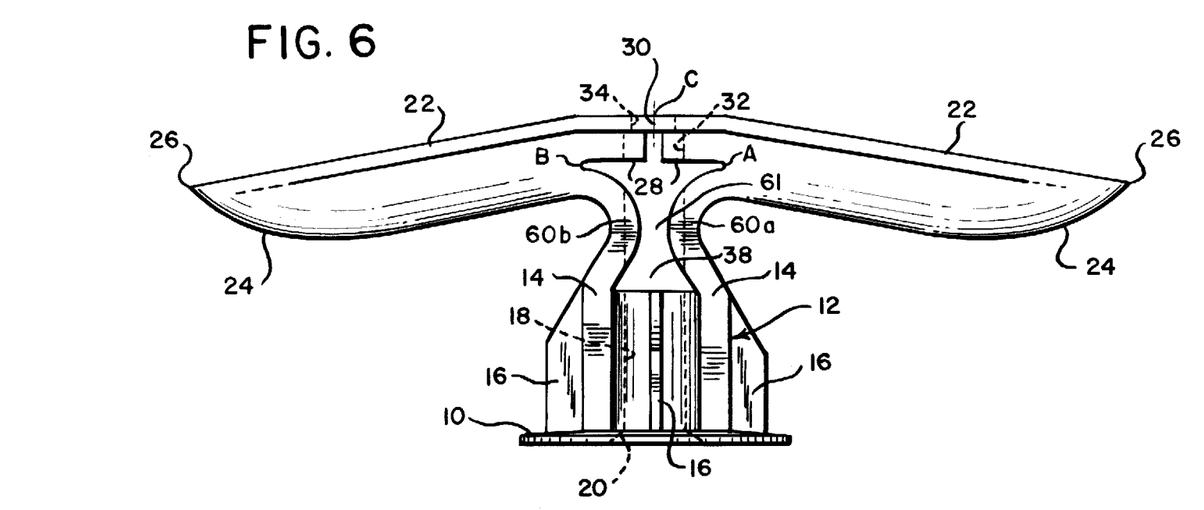
FIG. 6 is a side elevation of a second embodiment of a fastener element in accordance with the invention.
Figure 7:
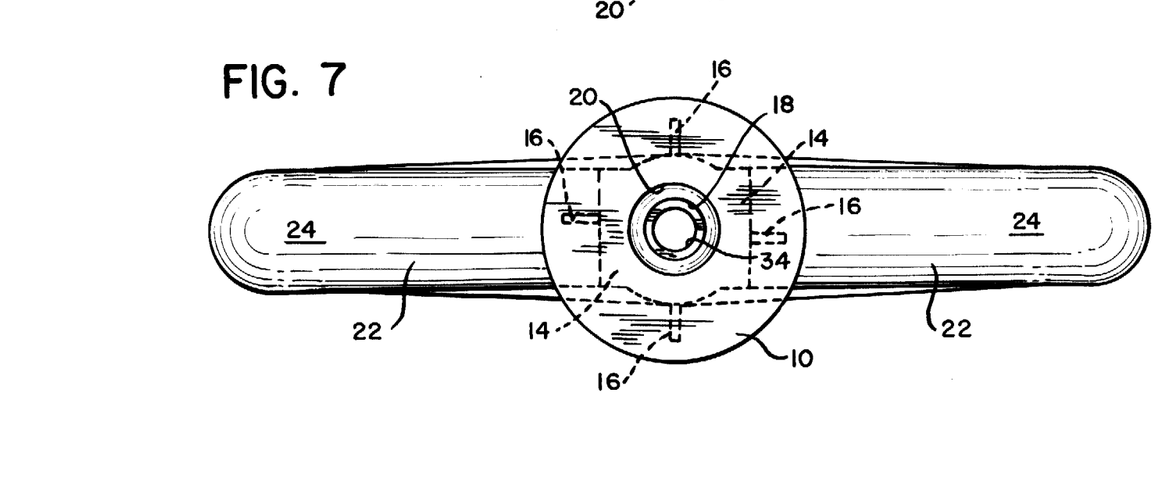
FIG. 7 is a bottom plan view of the fastener in FIG. 6.
Figure 8:
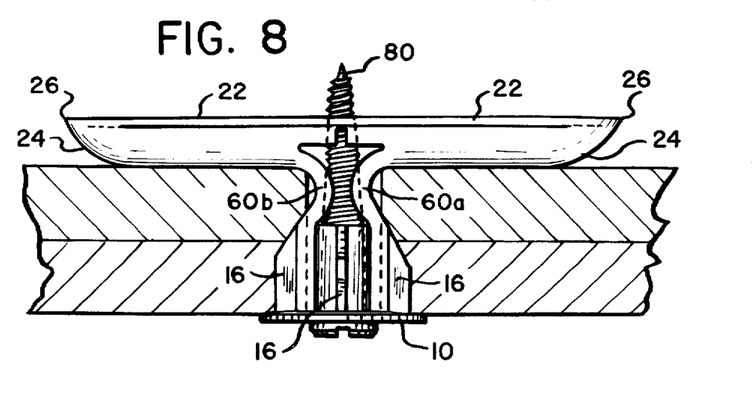
FIG. 8 is a schematic cross section of the fastener of FIGS. 6 and 7 illustrating its use in conjunction with an elongated retaining member.

FIGS. 6, 7, and 8 illustrate an alternative embodiment of the invention substantially the same as the embodiment of FIGS. 2-5 except that the pillar-like parts 14 include curved portions 60a and 60b curved radially inwardly into central passageway 18 to form a portion 61 of restricted cross-sectional area.

These curved portions, which can be termed memory springs, provide a spring force for biasing arms 22 into an overcenter locking position after their insertion into an opening in the collapsed condition.

In addition, the curved portions provide a spring force for biasing the walls of central passageway 18 into engagement with an elongated retaining threaded element inserted therein, such as threaded screw 80 in FIG. 8. Because the curved plastic pillar portions are biased into the passageway, the restricted portion can accept retaining elements having a wide range of diameters. If the diameter is too large, the passageway can be forced open against the bias force.

Typically the rotation of a threaded screw into the central passageway will thread the restricted area portion, thus providing enhanced engagement of the screw. This threading of the restricted area portion provides positive resistance against over-rotation of the screw and thus prevents collapse of the toggle arms due to excessive over-center displacement.

D. Third Embodiment (FIGS. 9 and 10)

Figure 9:
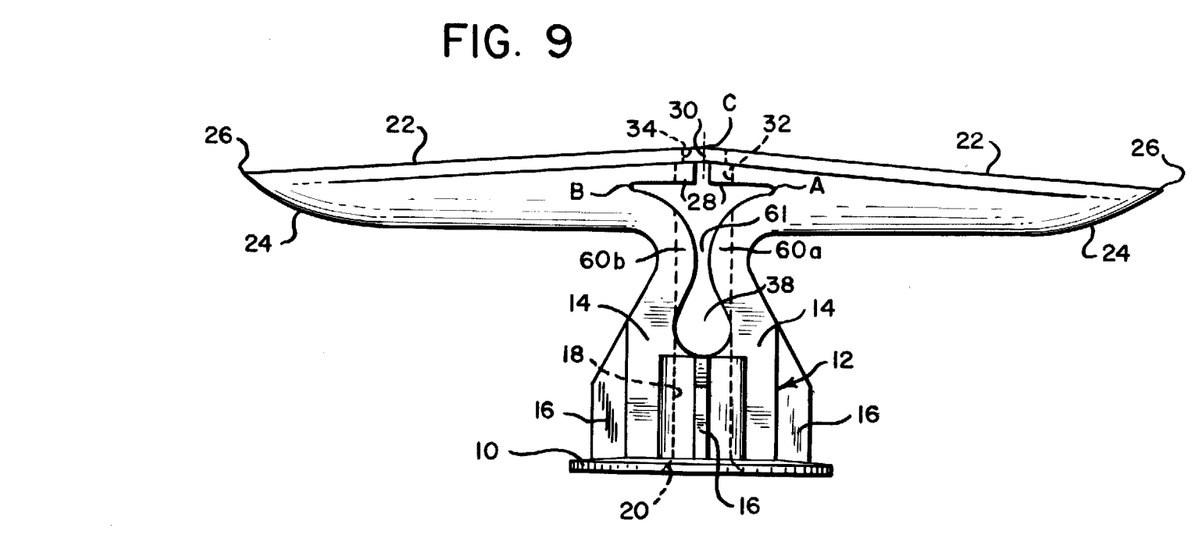
FIG. 9 is a side elevation of a third embodiment of a fastener element in accordance with the invention.
Figure 10:
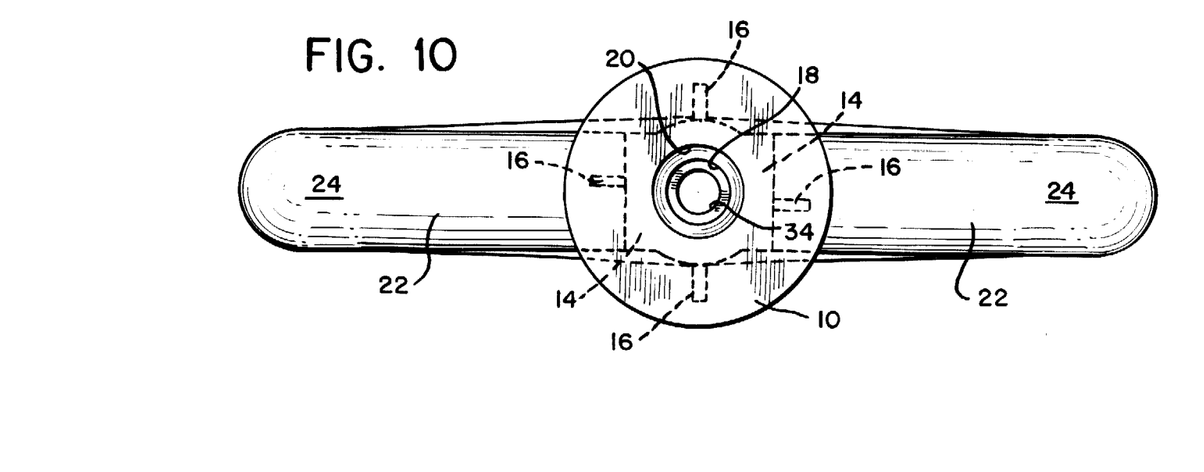
FIG. 10 is a bottom plan view of the fastener in FIG. 9.

FIGS. 9 and 10 illustrate a further alternative embodiment of the invention substantially identical to the embodiment of FIGS. 6, 7 and 8, except that the recessed portion 38 of the body is rounded in order to maximize the plastic material available in this area for engaging a screw. This embodiment operates in the same manner as the embodiment of FIGS. 6-8.

The fasteners of these first three embodiments, FIGS. 2-10, are preferably integrally molded plastic structures. They are preferably made by molding them in the open position in multicavity molds using conventional injection molding techniques.

E. Fourth Embodiment (FIGS. 11 and 12)

Figures 11, 12B:
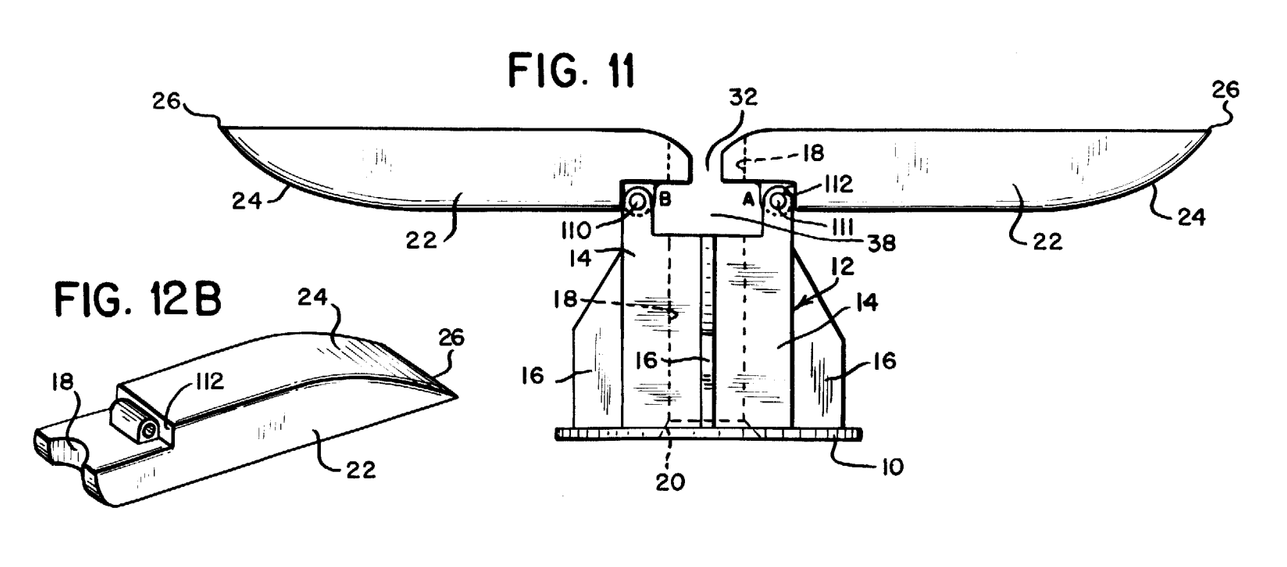
FIG. 11 is a side elevation of a fourth embodiment of a fastener element in accordance with the invention.
FIG. 12B is a perspective view of one arm of the fastener in FIG. 1.
Figure 12A:
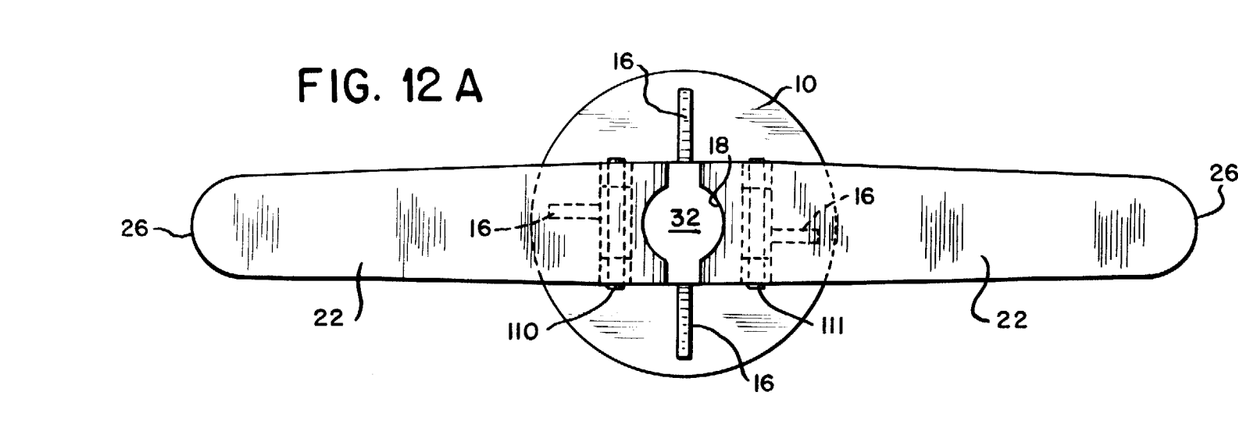
FIG. 12A is a top view of the fastener in FIG. 11.

FIGs. 11, 12A and 12B illustrate a fourth embodiment of the invention wherein physical hinges 110 and 111 are disposed at pivot points A and B. As shown in FIG. 12B, each arm is provided with a positive stop in the form of shoulder 112 to prevent rotation beyond the open position upon the insertion of an elongated retaining element. This embodiment can be fabricated of metal for applications where great strength is required.

F. Fifth Embodiment (FIGS. 13A and 13B)

Figure 13A:
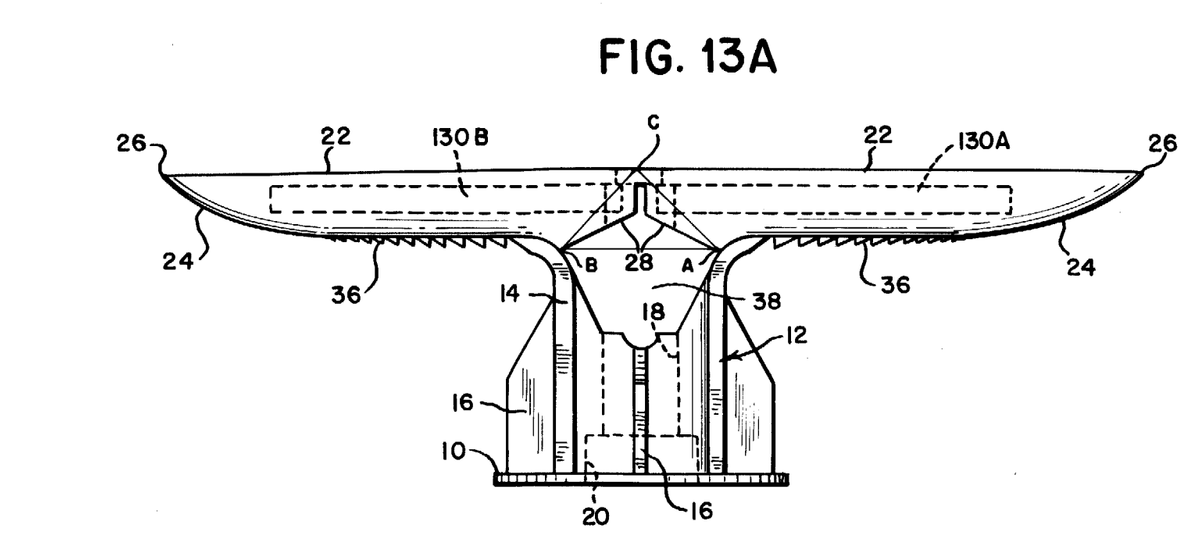
FIGS. 13A and 13B pertain to fasteners of the type shown in FIG. 3 modified by the inclusion of arm reinforcing members.

FIG. 13A illustrates a fifth embodiment of the invention substantially identical to that described in connection with FIG. 3, except for the inclusion of elongated, rigid reinforcing members 130A and 130B in each of arms 22, respectively.

Figure 13B:
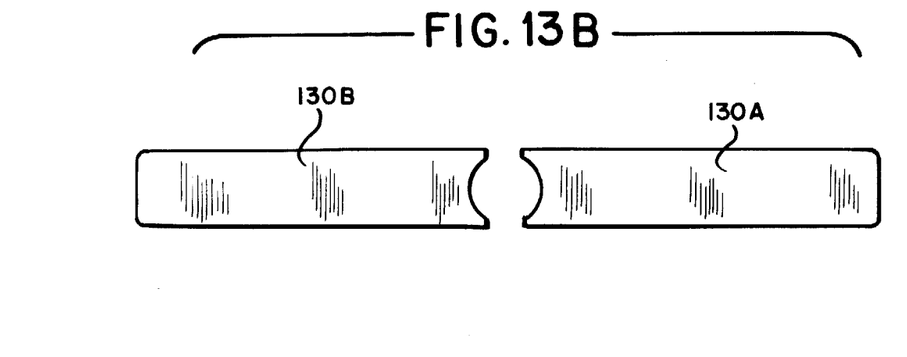

FIG. 13B provides a top view of reinforcing members 130A and 130B. These members are preferably metal, such as steel, and are incorporated into the plastic body of the fastener using conventional insert molding techniques.

G. Sixth Embodiment (FIGS. 14A and 14B)

Figure 14A:
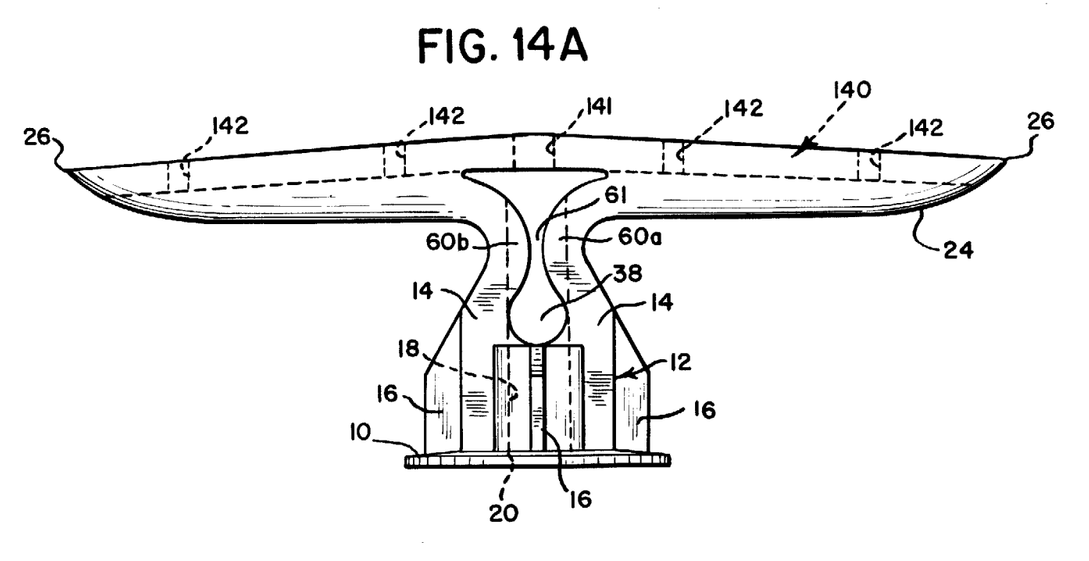
FIGS. 14A and 14B pertain to fasteners of the type shown in FIG. 9 modified by the inclusion of a first type of arm reinforcing member.

FIG. 14A illustrates a sixth embodiment of the invention substantially identical to that described in connection with FIG. 9, except for the attachment of a perforated, bendable reinforcing member 140 across the outer portion of arms 22.

Figure 14B:
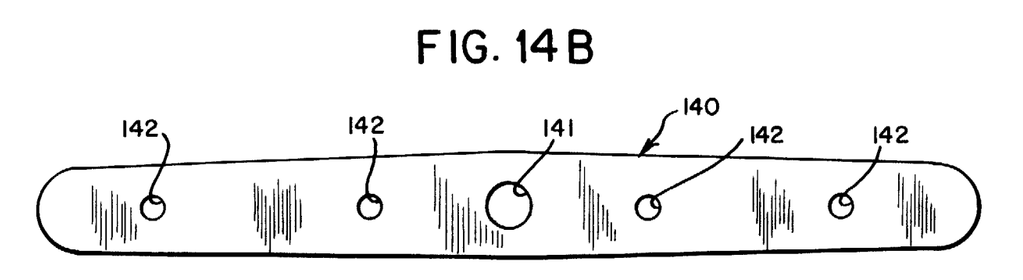

FIG. 14B provides a top view of reinforcing member 140. The member 140, which can be bendable metal, is perforated by opening 141 for alignment with central passageway 18. In addition, a plurality of openings 142 are preferably provided for permitting penetration of plastic during molding so that member 140 is attached to the fastener structure.

H. Seventh Embodiment (FIGS. 15A and 15B)

Figure 15A:
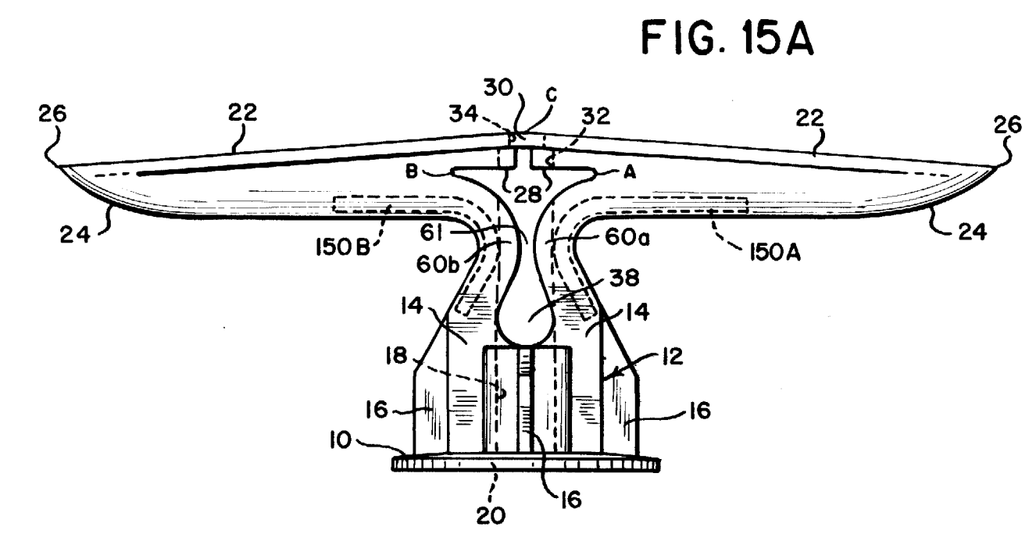
FIGS. 15A and 15B pertain to fasteners of the type shown in FIG. 9 modified by the inclusion of a second type of reinforcing member.

FIG. 15A illustrates a seventh embodiment of the invention substantially identical to that described in connection with FIG. 9, except for the inclusion of spring-like reinforcing members 150A and 150B across the areas A and B where the arms 22 are pivotally attached to the pillar-like portions of body 12.

Figure 15B:
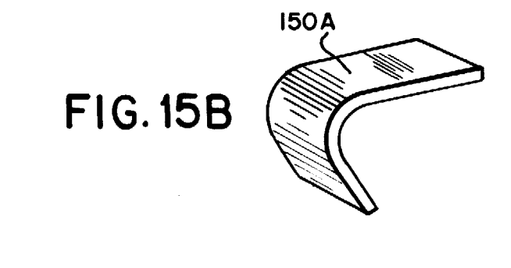

FIG. 15B provides a perspective view of one such member 150A, which can conveniently comprise spring steel. This member can be incorporated into the body by conventional insert molding techniques.

I. Eighth Embodiment (FIG. 16)

Figure 16:
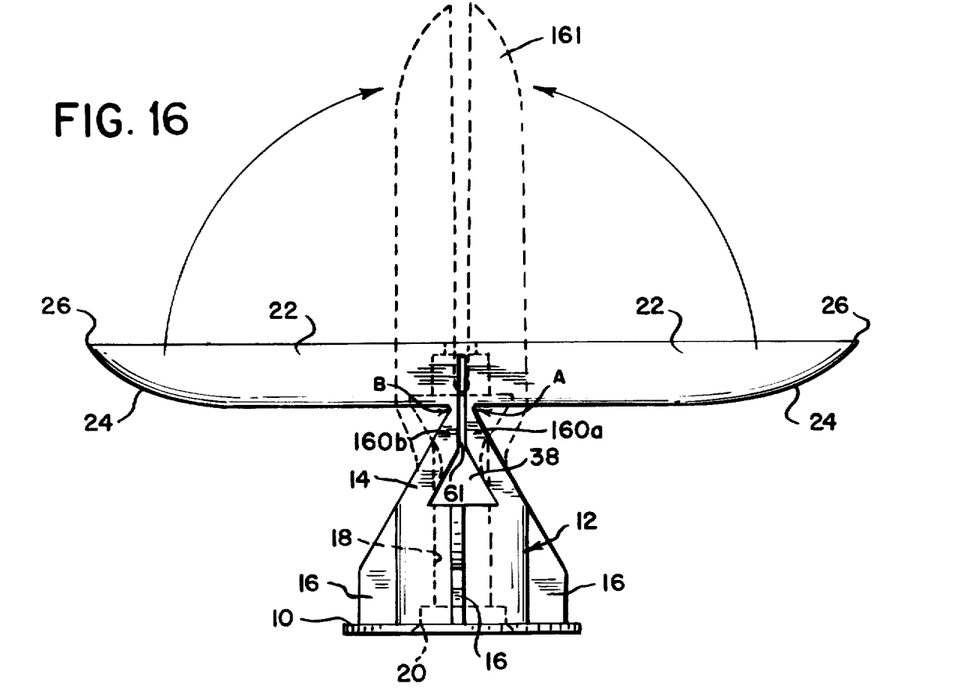
FIG. 16 pertains to a further embodiment of the invention.

FIG. 16 illustrates an eighth embodiment of the invention similar to that described in connection with FIG. 6, except that the pillars rather than being curved radially inwardly with respect to passageway 18, are straight but inclined radially inwardly at portions 160A and 160B in order to form a portion 61 of restricted cross-sectional area. This inclined structure performs the same functions as its curved counterpart, including spring biasing of the arms into locking position after insertion of the device into an opening. While the pivotal connections A and B are radially adjacent the body 12 in the collapsed position 161, they are well within the body radius in the expanded position.

J. Ninth Embodiment (FIGS. 17A and 17B)

Figures 17A, 17B:
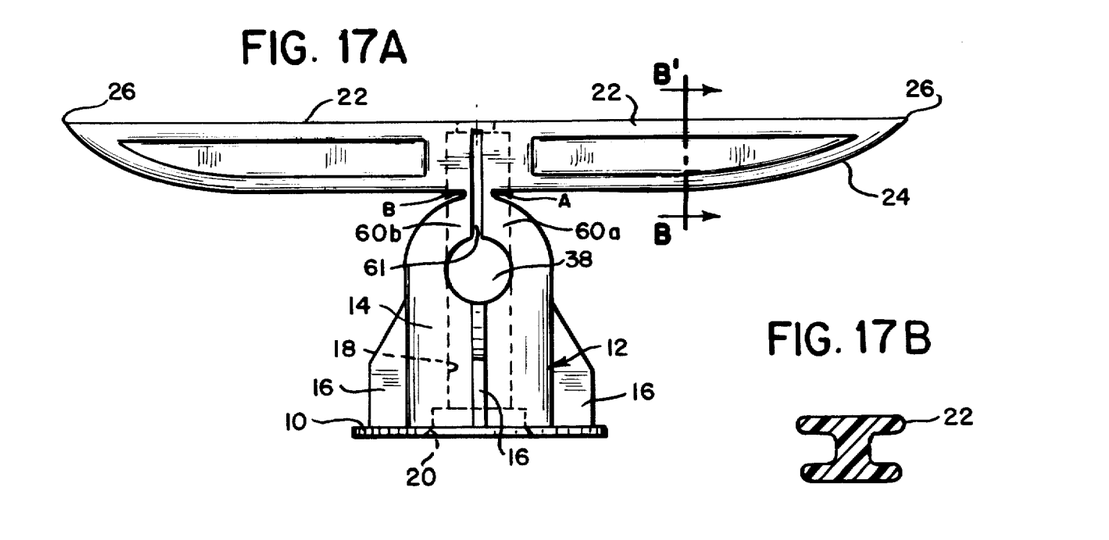
FIGS. 17A and 17B illustrate yet further embodiments of the invention.

FIG. 17A illustrates a ninth embodiment of the invention also similar to that described in connection with FIG. 6, except that the arms 22 are provided with a transverse cross section contoured to enhance their rigidity. Specifically, as shown in the cross-sectional view of FIG. 17B, each arm is provided with an I-beam cross section. It should also be noted that while the pillar-like parts of FIG. 17A have curvature in the opposite direction from the curvature of the corresponding parts in FIG. 6, the result in both embodiments is substantially the same, i.e., the pillars are spring-like members for opening the fastener and portions of the pillars are biased into the central passageway 18. Finally, it should be noted that in this embodiment, as in that of FIG. 16, the arm pivots in the expanded position are radially within the body 12.

While the invention has been described in connection with a small number of specific embodiments, it is to be understood that these are merely illustrative of the many other specific embodiments which utilize the principle of the invention. For example, while the body herein has been described as being basically cylindrical, this is merely a term of convenience and the body may take any of several forms depending upon the particular opening through which the body is to be passed and upon molding considerations. It will also be appreciated that while the embodiments illustrated are specifically designed to provide anchors for screws, they may well be adapted for various other uses from a simple cuff-link structure to a hook device, depending upon the role required. Thus numerous and varied devices can be made by those skilled in the art without departing from the spirit and scope of the present invention.

I claim:

1. In a fastening element for securement within an opening of the type comprising a head portion, a connecting portion for insertion into such opening, and at the end of said connecting portion remote from the head portion, locking means movable between a collapsed position in which the fastening element is insertable into such opening and an expanded position in which said locking means is effective in cooperation with an elongated retaining element inserted into the connecting portion to preclude removal of said element from such opening, the improvement wherein:

said connecting portion comprises a longitudinally extending body portion comprising a pair of opposed pillar-like parts; and said locking means comprises a pair of substantially rigid toggle arms pivotally connected to said pillar-like parts at radial locations substantially adjacent to or within the radius of said body in said expanded position and pivotally connected to each other on the longitudinal axis of said body portion by a flexible integral strap, whereby the toggle arms are movable toward each other to a collapsed position and away from each other to an expanded position, each toggle arm being of substantially greater length than the cross-sectional dimention of said body portion.

2. A fastening element according to claim 1 wherein said pillar-like parts form spring members for biasing said arms into locking position after insertion into such opening.

3. A fastening element according to claim 2 wherein said pillar-like parts are curved radially inwardly to form said spring members.

4. A fastening element according to claim 2 wherein said pillar-like parts are inclined radially inwardly to form said spring members.

5. A fastening element according to claim 1 wherein a central region of said body portion adjacent said locking means is recessed to accommodate adjacent portions of said arms when said locking means are in the collapsed position.

6. A fastening element according to claim 5 wherein portions of said respective arms adjacent said body portion are relieved in order to facilitate their accommodation into the recessed portion of said body.

7. A fastening element according to claim 5 wherein the recessed portion of said body is rounded.

8. A fastening element according to claim 1 wherein said body portion comprises a central passageway for receiving the elongated retaining element.

9. A fastening element according to claim 1 wherein said body comprises:
  a central passageway for receiving the elongated retaining element; and
  a pair of diametrically opposed pillar-like parts extending radially into said central passageway for providing a region of restricted diameter for engaging such retaining element.

10. A fastening element according to claim 9 wherein said pillar-like parts are curved radially inwardly into said central passageway.

11. A fastening element according to claim 9 wherein said pillar-like parts are inclined radially inwardly into said central passageway.

12. A fastening element according to claim 1 wherein the surface of said arms adjacent said head are provided with a tooth-like configuration.

13. A fastening element according to claim 1 wherein said arms are pivotally connected to said pillar-like portions of said body portion by hinge means.

14. A fastening element according to claim 1 wherein said fastening element is an integrally molded plastic fastening element.

15. A fastening element according to claim 1 wherein said rigid arms are plastic arms including elongated, metal reinforcing means incorporated therein.

16. A fastening element according to claim 1 wherein said rigid arms are plastic arms including an elongated metal reinforcing means attached thereto.

17. A fastening element according to claim 1 including spring-like metal reinforcing means across the areas where said arms are pivotally attached to said pillar-like portions of said body.

18. A fastening element according to claim 1 wherein said arms are contoured in transverse cross section for enhancing their rigidity.

19. A fastening element according to claim 1 wherein said arms are provided with an I-beam contour in transverse cross section.

* * * * *